US011313095B2

(12) United States Patent
Morey

(10) Patent No.: US 11,313,095 B2
(45) Date of Patent: Apr. 26, 2022

(54) LANDSCAPE AND PAVER EDGING SPIKE

(71) Applicant: Dimex, LLC, Marietta, OH (US)

(72) Inventor: Kevin R. Morey, Marietta, OH (US)

(73) Assignee: Dimex, LLC, Marietta, OH (US)

( * ) Notice: Subject to any disclaimer, the term of this patent is extended or adjusted under 35 U.S.C. 154(b) by 169 days.

(21) Appl. No.: 16/871,576

(22) Filed: May 11, 2020

(65) Prior Publication Data

US 2020/0270835 A1  Aug. 27, 2020

Related U.S. Application Data

(63) Continuation-in-part of application No. 15/949,236, filed on Apr. 10, 2018, now abandoned.

(60) Provisional application No. 62/484,418, filed on Apr. 12, 2017.

(51) Int. Cl.
*A01G 9/28* (2018.01)
*E02D 5/80* (2006.01)

(52) U.S. Cl.
CPC ............. *E02D 5/80* (2013.01); *A01G 9/28* (2018.02)

(58) Field of Classification Search
CPC .................................. A01G 9/28; E02D 5/80
See application file for complete search history.

(56) References Cited

U.S. PATENT DOCUMENTS

| 857,751 A * | 6/1907 | Parker et al. ........... E02D 5/801 52/156 |
|---|---|---|
| 2,809,809 A | 10/1957 | Johnston |
| 3,957,383 A | 5/1976 | Fredericks |
| 4,361,983 A | 12/1982 | Wilson |
| 4,508,319 A | 4/1985 | Tappan et al. |
| 4,644,685 A | 2/1987 | Tisbo et al. |
| 4,831,776 A | 5/1989 | Fritch |
| 4,863,307 A | 9/1989 | Jones |
| 5,020,272 A | 6/1991 | Herrema et al. |
| 5,073,061 A | 12/1991 | Jones |
| 5,157,867 A | 10/1992 | Fritch |
| 5,212,917 A | 5/1993 | Kurtz et al. |
| 5,230,187 A | 7/1993 | Reimann |
| 5,240,343 A | 8/1993 | Strobl, Jr. |
| 5,301,461 A | 4/1994 | Zwier |
| 5,315,780 A | 5/1994 | Thomas |

(Continued)

OTHER PUBLICATIONS

Valley View Industries, Easy Diamond Ground Lawn Edging (EDGF-20), Brochure, 1 pg., not dated.
Permaloc, StructurEdge, Brochure, 1pg., not dated.

*Primary Examiner* — Monica L Barlow
(74) *Attorney, Agent, or Firm* — Wood Herron & Evans LLP

(57) ABSTRACT

This invention in various embodiments is a spike for use with landscape and paver edging. The spike may include a generally circular disk-shaped head and opposite from the head is a tip of the spike. The spike may include one or more features for securing the spike in place once installed with the edging product. Another feature according to various embodiments of this invention of the spike is an upper head stabilizer. The stabilizer may extend from the shaft to an underside of the head. In some embodiments, the stabilizer may be provided in discrete sections and positioned diametrically opposite from one another on the shaft and the undersurface of the head. The stabilizer may support the entire radial dimension of the head and is joined to the shaft.

18 Claims, 11 Drawing Sheets

(56) References Cited

U.S. PATENT DOCUMENTS

| | | | |
|---|---|---|---|
| 5,375,941 | A | 12/1994 | Strobl, Jr. |
| 5,421,118 | A | 6/1995 | Bauer |
| 5,640,801 | A | 6/1997 | Rynberk |
| 5,901,526 | A | 5/1999 | Vidmar et al. |
| 6,012,254 | A | 1/2000 | Gaston |
| 6,038,811 | A | 3/2000 | Conway |
| 6,085,458 | A | 7/2000 | Gau |
| 6,324,783 | B1 | 12/2001 | McIntyre et al. |
| 6,379,078 | B1 | 4/2002 | Zwier |
| 7,434,360 | B2 | 10/2008 | Traub et al. |
| 7,596,903 | B1 | 10/2009 | Flanagan |
| 7,950,200 | B2 * | 5/2011 | Tropiano ............ E02D 5/74 52/745.21 |
| 8,464,464 | B2 | 6/2013 | Rosaen |
| 8,753,042 | B1 | 6/2014 | Thompson et al. |
| 9,980,441 | B2 | 5/2018 | Rynberk, Jr. |
| D856,788 | S | 8/2019 | Morey |
| 2010/0325968 | A1 * | 12/2010 | Koskovich ............ E02D 5/80 52/4 |
| 2014/0259902 | A1 | 9/2014 | Friederichs et al. |
| 2015/0034731 | A1 | 2/2015 | Jackson |
| 2016/0286730 | A1 | 10/2016 | Holsworth et al. |
| 2017/0233973 | A1 * | 8/2017 | Rynberk, Jr. ............ E02D 5/80 52/157 |

* cited by examiner

LANDSCAPE AND PAVER EDGING SPIKE

This claims the benefit of U.S. Provisional Patent Application Ser. No. 62/484,418, filed Apr. 12, 2017 and U.S. patent application Ser. No. 15/949,236, filed Apr. 10, 2018. Each of these prior applications is hereby incorporated by reference in its entirety.

BACKGROUND OF THE INVENTION

This invention relates to devices used for edging along a garden, paved path or other landscape feature, and more particularly, to a device for securing edging of this type in place.

Garden edging is typically used in residential and commercial applications as a barrier between a garden bed and an adjacent bed or a lawn. Paver edging is used along the edges of sidewalks and driveways made of paver bricks or stone to hold the pavers in place. Such edging may be constructed as an elongated L-shaped plastic device having an upper generally planar barrier wall and a lower anchor portion extending perpendicular from the barrier wall. The barrier wall may be used as a handhold during the installation process, and it is often the only part of the edging that is visible after the edging has been installed.

A common problem with available edging material is that, over time, pressures resulting from the heating and freezing, of the ground, plus moisture from rain, will combine to slowly work the edging material out of the ground. This, of course, is a particularly undesired result given the amount of time and effort required to properly install the edging in the first place. To that end, the lower anchor portion of the edging material may be successful in delaying the dislodging of the material, but it does not prevent it in many situations.

Accordingly, there is a need for an improved anchoring system for an edging panel that can counter the environmental factors at work and retain the edging in position. It would also be advantageous to have an edging anchor system which is robust and not likely to be damaged during the installation process or after it is installed.

SUMMARY OF THE INVENTION

This invention in various embodiments is a spike for use with landscape and paver edging. The spike may include a generally circular disk-shaped head and opposite from the head is a tip of the spike.

The spike may include a first feature for securing the spike in place once installed with the edging product in the form of a series of angled ridges formed on the exterior of the shaft of the spike. Each ridge may have a generally tapered outer peripheral configuration with a lower edge of each ridge being narrower in diameter and circumference on the shaft than an upper edge of each ridge thereby providing a tapered to the outer side wall of each ridge. In this manner, when the spike is inserted into the ground, the tendency for the spike to move upwardly is resisted by the tapered ridges and the upper edge of each ridge may dig into or engage the ground when the spike is urged or moved in an upward direction.

The spike is typically used in combination with an edging product which is to be positioned adjacent to a grass or turf section. The edging product may be used as a paver restraint or adjacent to a landscaping area. The edging product commonly has an L-shaped cross-sectional configuration including an upper generally planar barrier wall and a lower anchor portion extending perpendicularly from the barrier wall. The barrier wall will be juxtaposed against a turf or grass section.

A further feature of some embodiments of the spike is a series of spaced wings extending perpendicularly from the longitudinal axis of the shaft. The wings may take any one of a variety of configurations according to this invention. The wings each may be generally triangular with an upper edge of each wing being generally perpendicular to the longitudinal axis of the shaft and a lower of edge of each wing being at an angle relative to the longitudinal axis of the shaft. The wings may be provided in pairs and positioned to extend radially from the shaft in opposite directions. The upper edge of each wing is intended to provide a further mechanism or feature for resisting the upward movement of the spike once it is inserted into the ground to anchor the edging device. The angled lower edge of the spike facilitates insertion into the ground. The contour of the lower edge may likewise be tapered to assist in the insertion of the spike into the ground.

Another feature according to various embodiments of this invention of the spike is an upper head stabilizer. The stabilizer may extend from the shaft to an underside of the head. In some embodiments, the stabilizer may be provided in discrete sections and positioned diametrically opposite from one another on the shaft and the undersurface of the head. The stabilizer may support the entire radial dimension of the head and is joined to the shaft.

During installation of the spike, the head is contacted commonly with a hammer or other tool. Off center blows by the hammer onto the head may tend to break, dislodge or contort the head and adjacent portions of the shaft. The stabilizing feature according to various embodiments of this invention is intended to support the head during installation and the repeated blows and impacts by the hammer whether those impacts be aligned with the longitudinal axis of the shaft or misaligned therefrom.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION OF THE INVENTION

Figure 1:
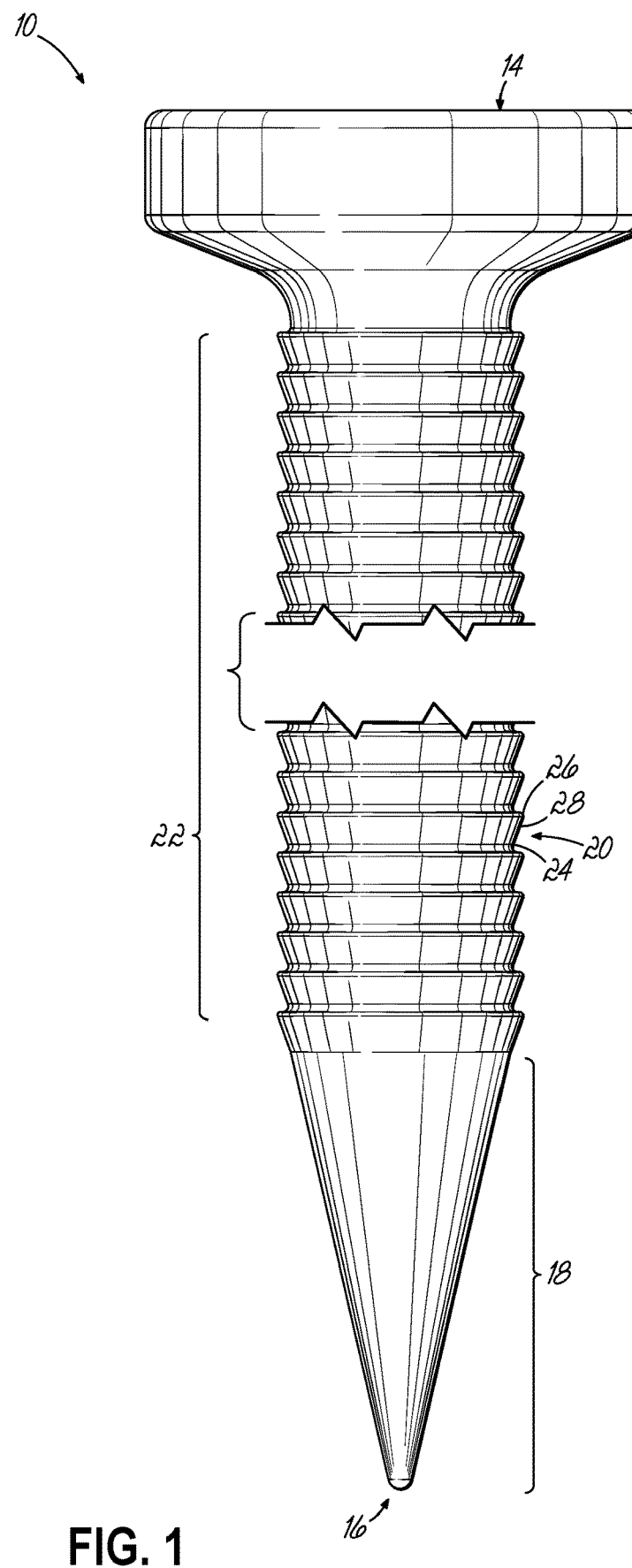
FIG. 1 is a side elevational view of one embodiment of a spike for use with landscape and paver edging according to this invention.
Figure 2:
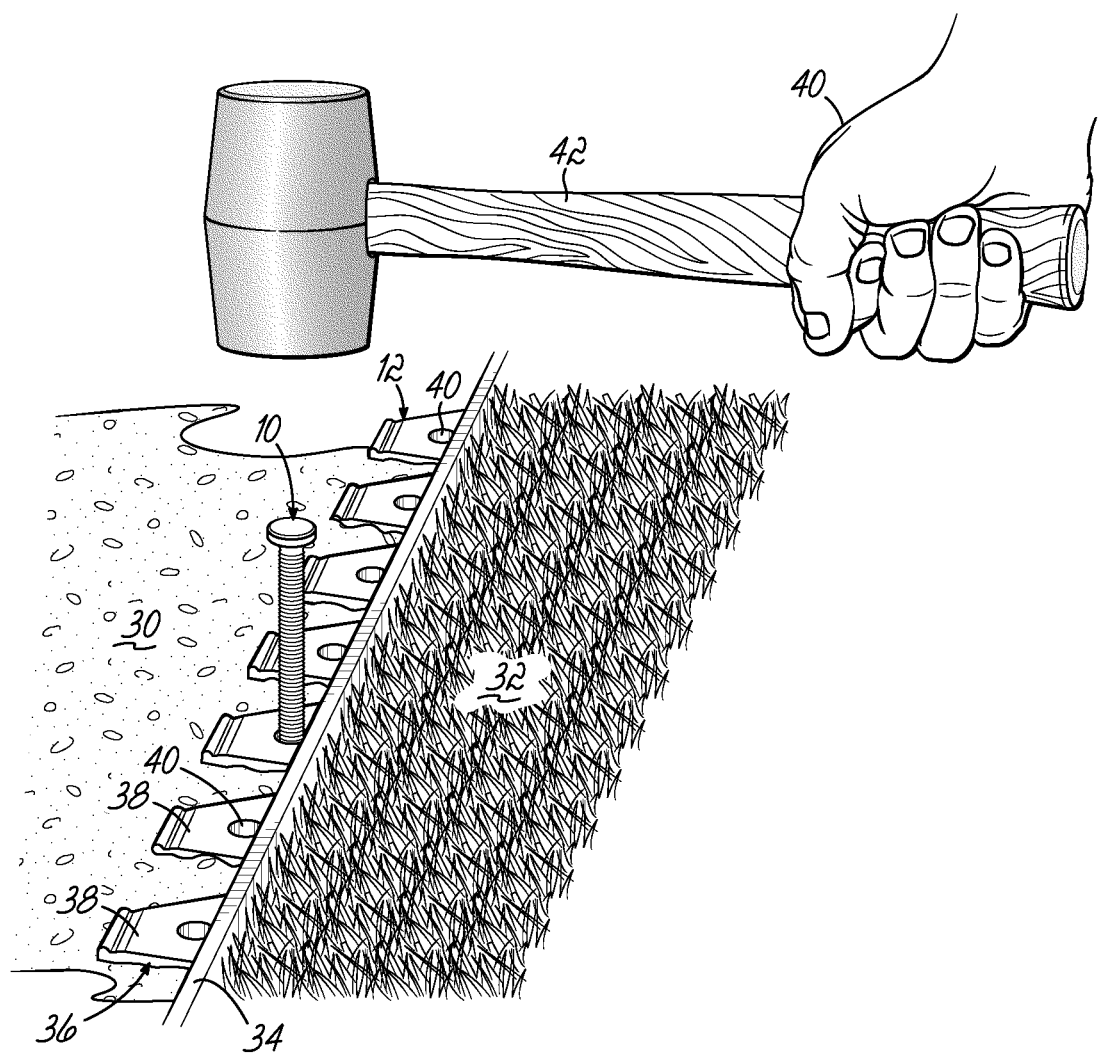
FIG. 2 is a perspective view of a spike being driven into the ground to secure a landscape edging device.

Referring to FIGS. 1 and 2, a first embodiment of a spike 10 for use with landscape and paver edging 12 is shown. The spike 10 includes a generally circular disk-shaped head 14 and opposite from the head is a tip 16 of the spike 10, which in the embodiment shown in FIG. 1, is a rounded point of a conical-shaped tip section 18.

The spike 10 of FIG. 1 includes a first feature for securing the spike in place once installed with the edging product 12. The first feature of the embodiment in FIG. 1 is a series of angled ridges 20 formed on the exterior of a shaft 22 of the spike 10. Each ridge 20 has a generally tapered outer peripheral configuration with a lower edge 24 of each ridge 20 being narrower in diameter and circumference on the shaft than an upper edge 26 of each ridge 20 thereby providing an angulared tapered configuration to the outer side wall 28 of each ridge 20. In this manner, when the spike 10 is inserted into the ground 30, the tendency for the spike 10 to move upwardly is resisted by the upper edge 26 of each ridge 20 which may dig into or engage the ground 30 when the spike 10 is urged or moved in an upward direction.

Referring to FIG. 2, the spike 10 is typically used in combination with an edging product 12 which is to be positioned adjacent to a grass or turf section 32 and adjacent to pavers or landscaping. The edging product 12 commonly has an L-shaped cross-sectional configuration including an upper generally planar barrier wall 34 and a lower anchor portion 36 extending perpendicularly from the barrier wall 34. The barrier wall 34 will be juxtaposed against the turf or grass section 32, or in the case of paver edging, against the paver bricks. The lower anchor portion 36 may take any one of a variety of configurations as well as the upper barrier wall 34 may take any one of a variety of configurations only one of which is shown in FIG. 2 according to this invention. Alternative embodiments of the edging product 12 are shown in U.S. Pat. Nos. D773,074; D776,834; D748,823; D748,822; D733,936; D586,005; D543,286; D424,714 and D378,857 or a variety of other configurations or products, some of which are commercially available from the assignee of this invention, Dimex, LLC. Each of these identified patents is hereby incorporated by reference in its entirety.

The anchor portion 36 of the edging product 12 shown in FIG. 2 includes a series of spaced tabs 38 extending perpendicularly from the barrier wall 34 of the edging product 12. The spacing and configuration of the tabs 38 allows for the edging product 12 to be bent in a convex or concave orientation. Each tab 38 includes an aperture 40 through which the spike 10 according to this invention in various embodiments may be inserted and driven into the ground 30 to secure the edging device 12. The aperture 40 shown in FIG. 2 is generally circular, but other configurations may be appropriate depending on the configuration of the spike and the particular application. One common shape of the aperture 40 is referred to as a "keyhole" shape which includes a circular hole with a rectangular cut across it to accommodate spikes with projections such as spike 10 shown herein, round spikes and flat spikes. The spike 10 is typically driven through the aperture 40 and into the ground 30 by hammer or another tool 42 utilized by an installer 44.

Figure 3:
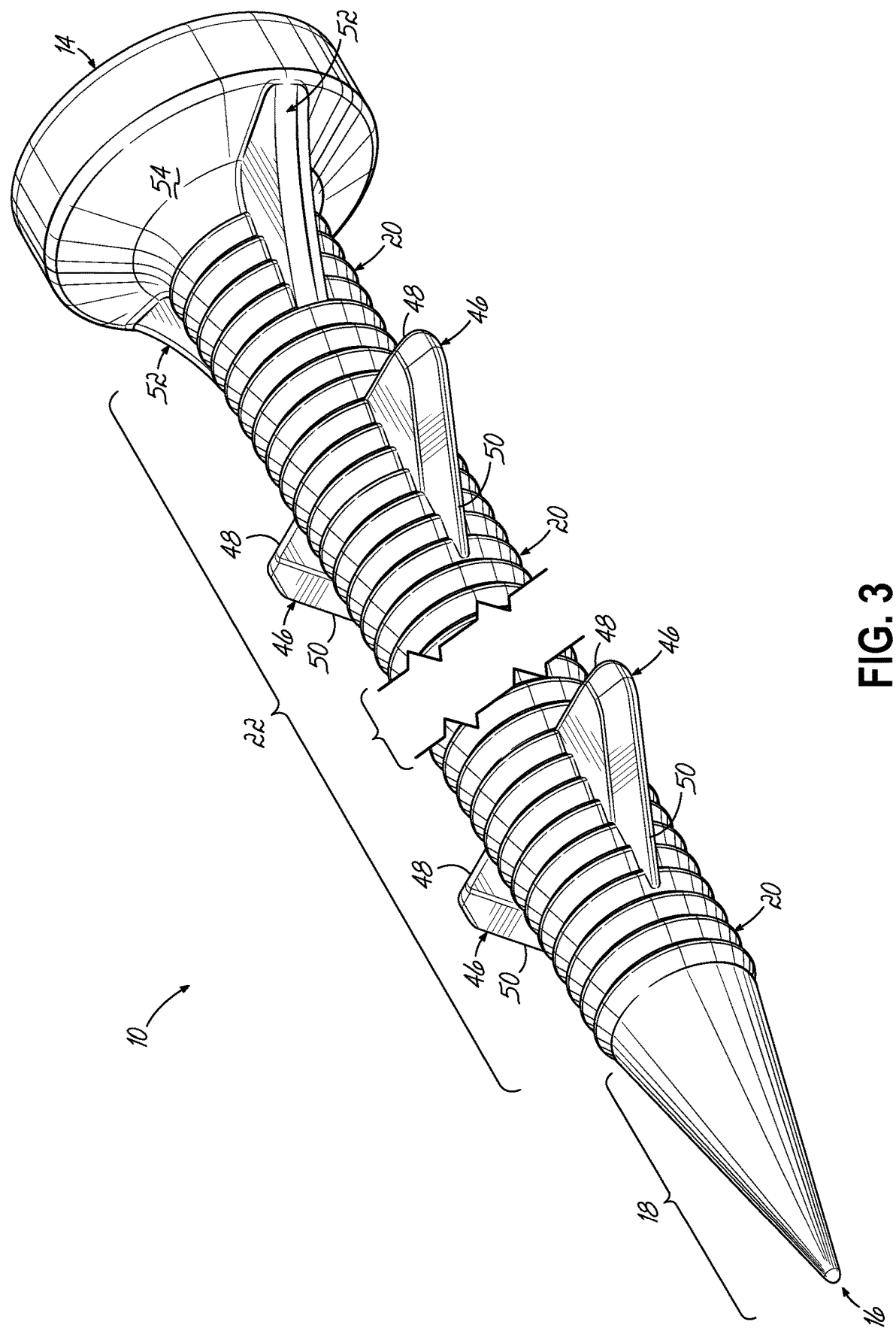
FIG. 3 is a perspective view of an alternative embodiment of a spike according to this invention.
Figure 4:
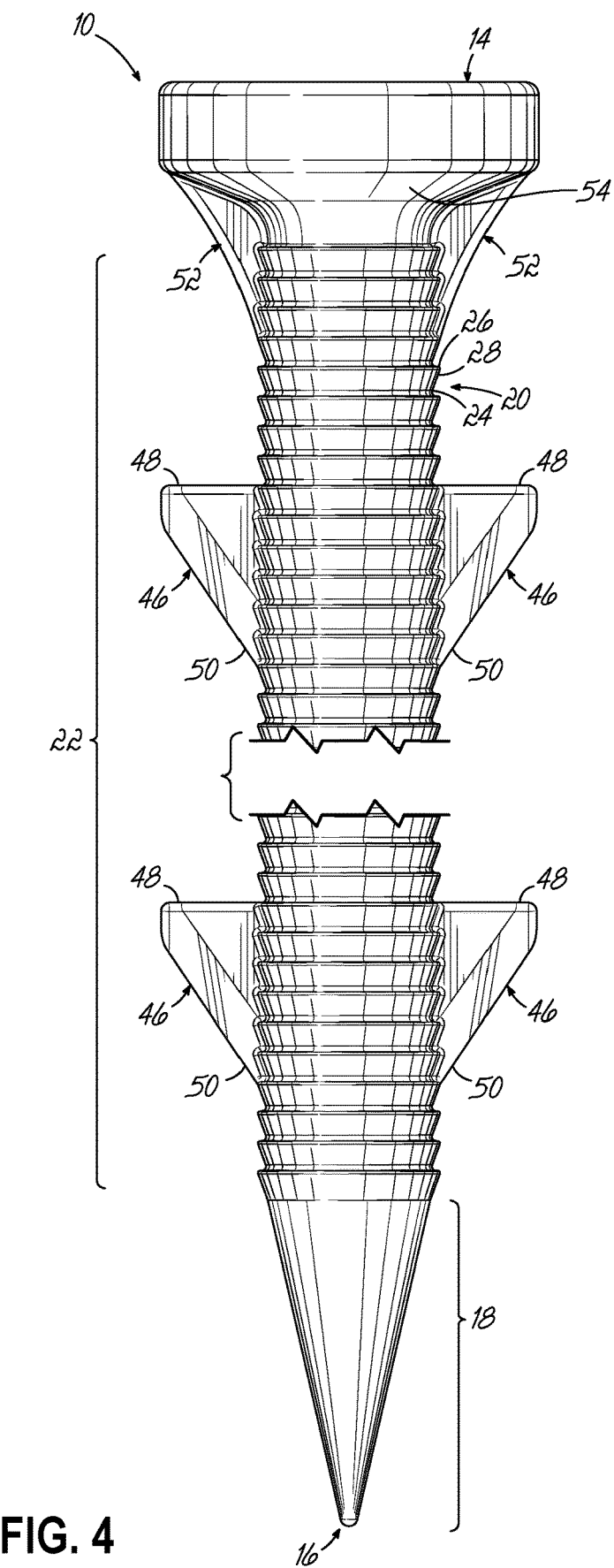
FIG. 4 is a front elevational view of the spike of FIG. 3.

A further alternative embodiment of the spike 10 according to this invention is shown in FIGS. 3 and 4. The spike 10 according to this embodiment includes the ridges 20 protruding from the shaft 22 as in the embodiment of FIG. 1. The embodiment of FIGS. 3 and 4 also include a series of spaced wings 46 extending perpendicularly from the longitudinal axis of the shaft 22. The wings 46 may take any one of a variety of configurations according to this invention. The wings 46 of the embodiment of FIGS. 3 and 4 are each generally triangular with an upper edge 48 of each wing 46 being generally perpendicular to the longitudinal axis of the shaft 22 and a lower of edge 50 of each wing 46 being at an angle relative to the longitudinal axis of the shaft 22. The wings 46 may be provided in pairs and positioned to extend radially from the shaft 22 in opposite directions as shown in FIGS. 3 and 4. The upper edge 48 of each wing 46 is intended to provide a further mechanism or feature for resisting the upward movement of the spike 10 once it is inserted into the ground 30 to anchor the edging device 12. The angled lower edge 50 of the spike 10 helps to facilitate insertion into the ground 30. The contour of the lower edge 50 may likewise be tapered to assist in the insertion of the spike 10 into the ground 30.

Figure 5:
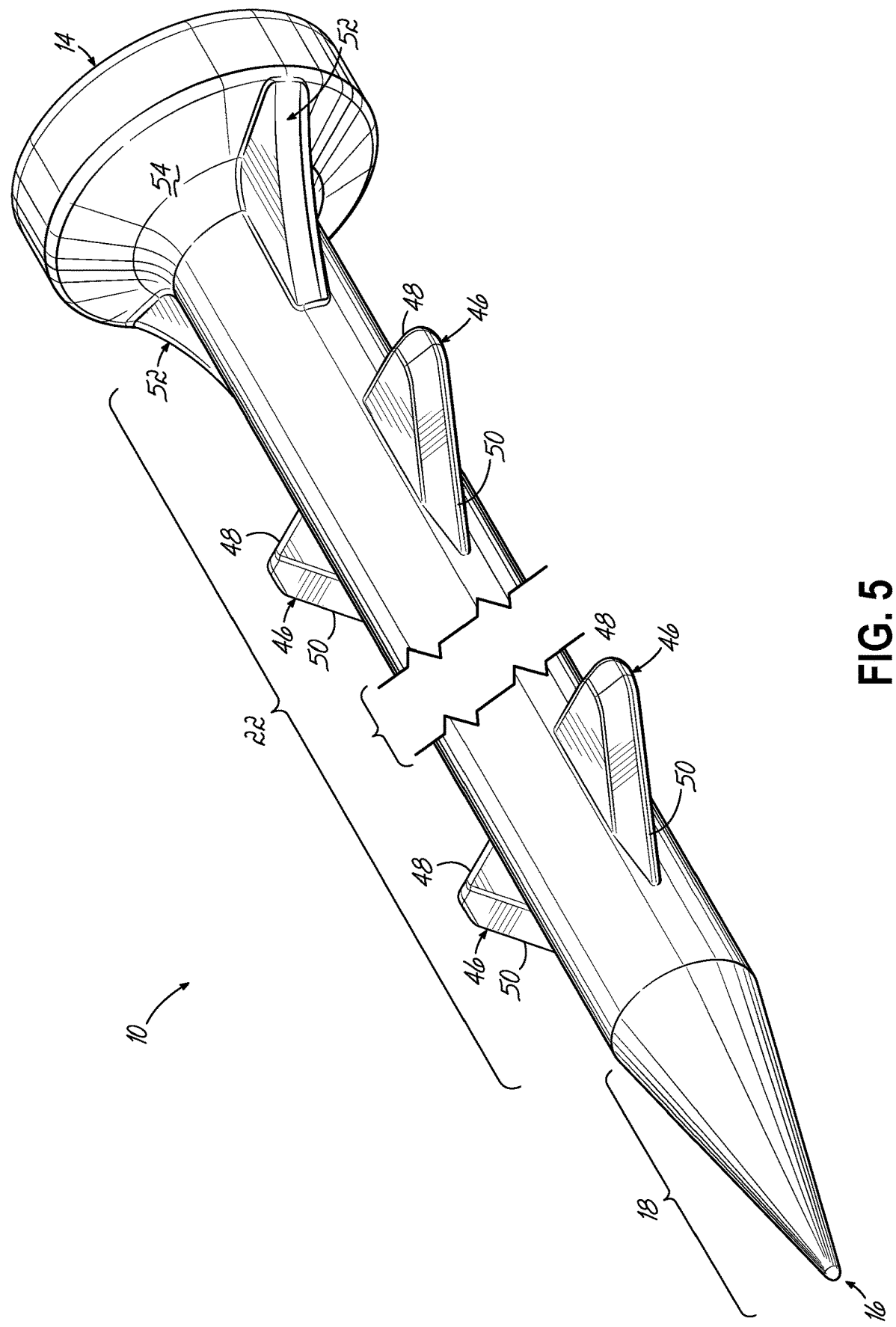
FIG. 5 is a perspective view a further alternative embodiment of a spike according to this invention.

A further embodiment of the spike 10 according to this invention is shown in FIG. 5 which includes the spaced wings 46 on the shaft 22 of the spike 10; however, the ridges on the shaft are omitted from the embodiment of FIG. 5 and the outer surface of the shaft 22 is generally smooth with the exception of the wings.

Other embodiments of the spike 10 according to this invention are possible and examples of alternative embodiments are shown in U.S. Design patent application Serial Nos. 29/599,212, filed Mar. 31, 2017 and Ser. No. 29/676, 305, filed Jan. 10, 2019 and each is hereby incorporated by reference in its entirety.

Another feature according to various embodiments of this invention of the spike 10 is shown in the embodiments of FIGS. 3-5 and includes an upper head stabilizer 52. The stabilizer 52 in the embodiments of FIGS. 3-5 extends from the shaft 22 to an underside 54 of the head 14. In some embodiments, the stabilizer 52 may be provided in discrete sections as shown in FIGS. 3-5 and positioned diametrically opposite from one another on the shaft 22 and the underside 54 of the head 14. The stabilizer 52 may support the entire radial and circumferential dimensions of the head 14 and be joined to the shaft 22. In one embodiment as shown in FIGS. 3-5, the stabilizer 52 is generally triangular in shape with one edge joined to the shaft 22 and another edge joined to the underside 54 of the head 14. A third edge of the triangular shaped stabilizer 52 extends from the shaft 22 to the head 14. The stabilizers 52 are aligned with the wings 46 in the embodiments of FIGS. 3-5. It will be appreciated by those of ordinary skill in the art that other shapes, positions, configurations and designs for the stabilizer 52 are within the scope of this invention.

During installation of the spike 10, the head 14 is contacted commonly with the hammer or other tool 42. Off center blows by the hammer 42 onto the head 14 may tend to break, dislodge or contort the head 14 and adjacent portions of the shaft 22. The stabilizer 52 according to various embodiments of this invention is intended to support the head 14 during installation and the repeated blows and impacts by the hammer 42 whether those impacts be aligned with the longitudinal axis of the shaft 22 or misaligned therefrom.

Figure 6:
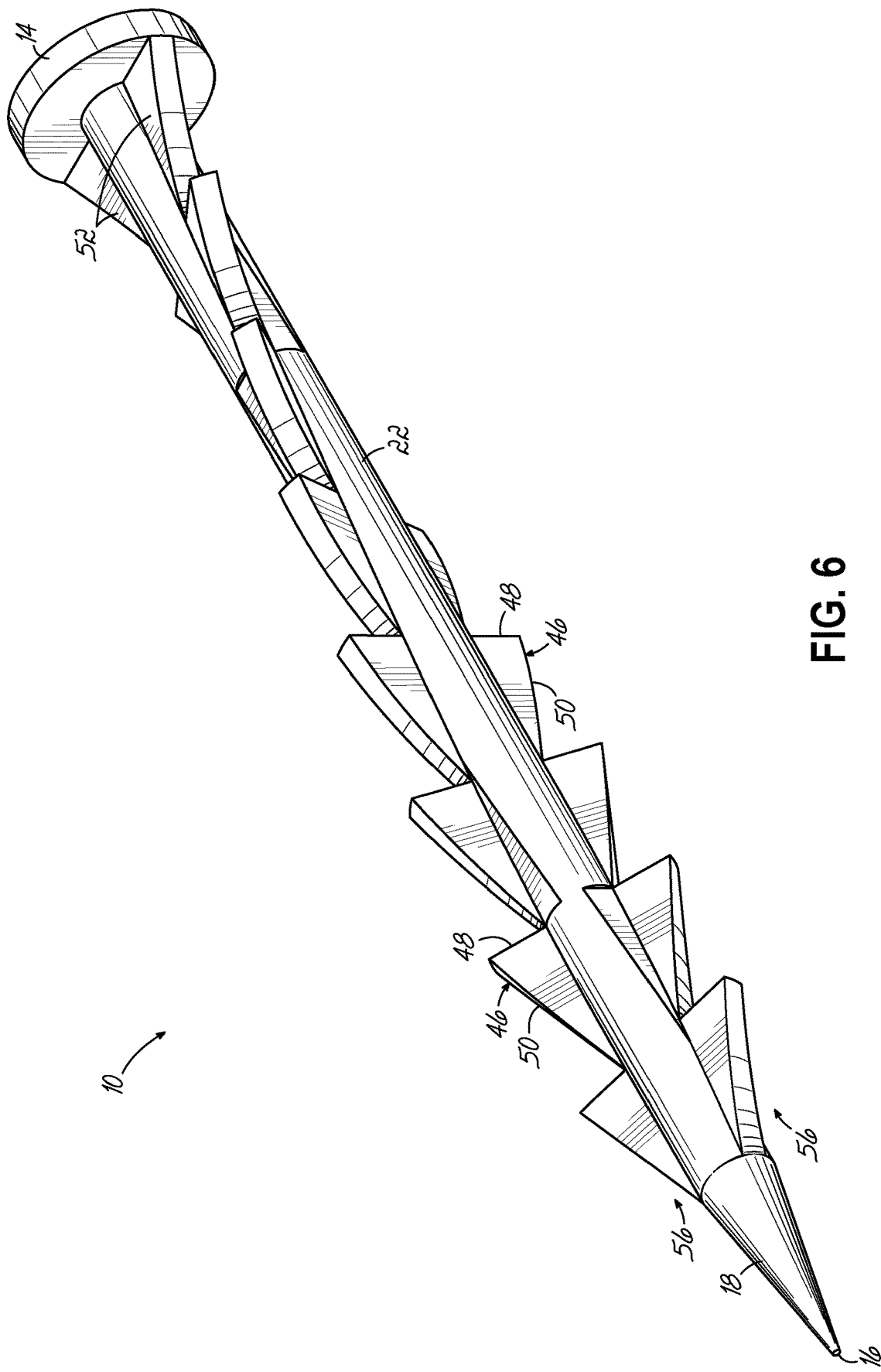
FIG. 6 is a perspective view of a still further alternative embodiment of a spike according to this invention.
Figure 7:
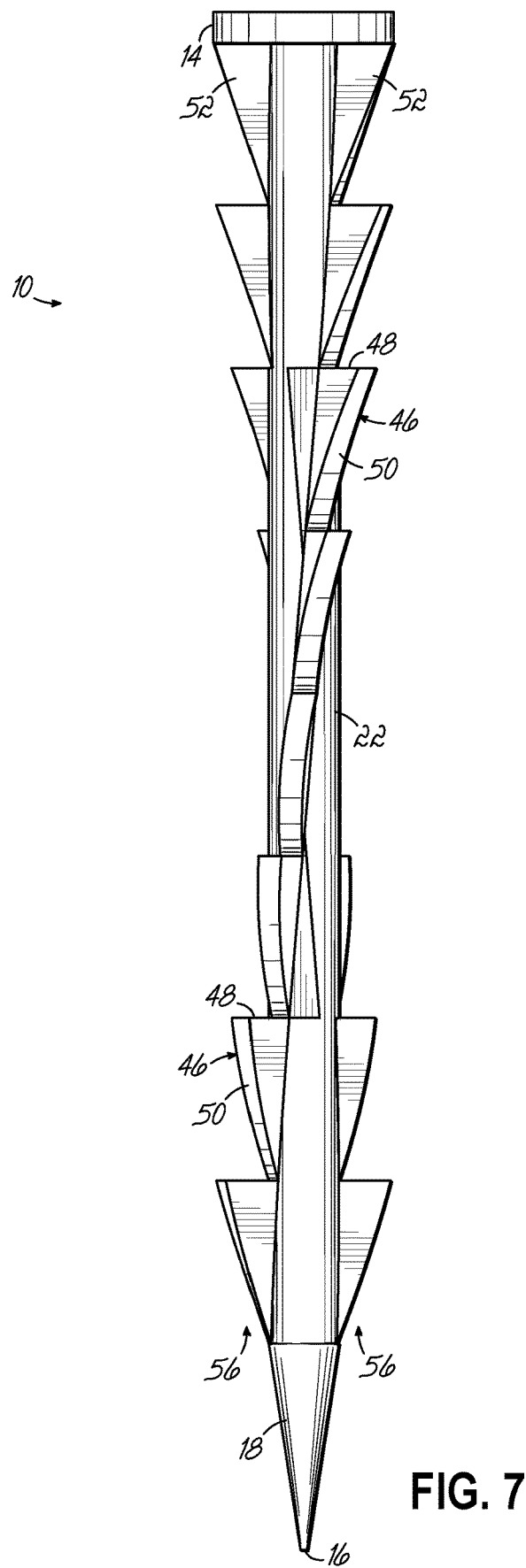
FIG. 7 is a front elevational view of the spike of FIG. 6.
Figure 8:
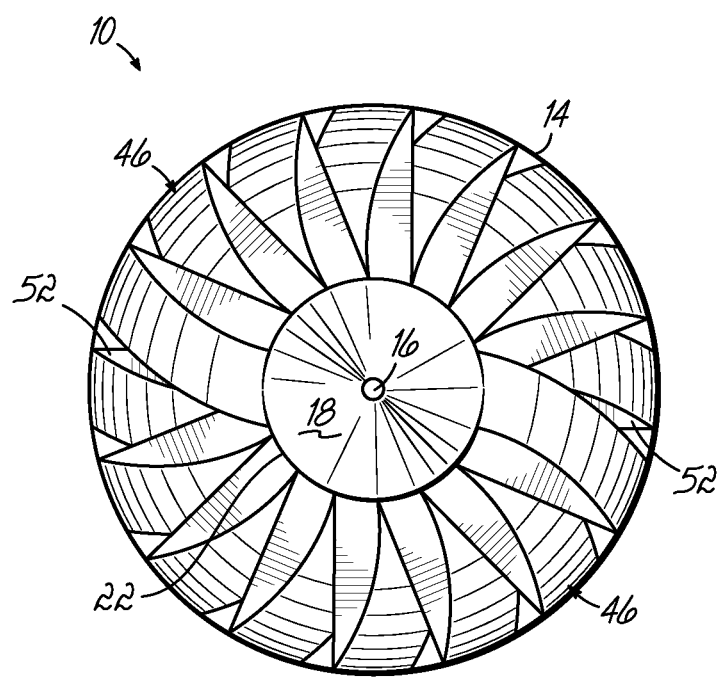
FIG. 8 is a bottom view of the spike of FIGS. 6-7.

A further alternative embodiment of the spike 10 according to this invention is shown in FIGS. 6-8 where like elements are identified by the same reference numerals utilized in prior embodiments of this invention. The spike 10 of FIGS. 6-8 includes the head 14, tip 16 and shaft 22 as well as the stabilizer 52 and wings 46. As shown in FIGS. 6-8, the shaft 22 has a right circular cylindrical configuration and a circular cross-sectional configuration. The wings 46 of this embodiment are arranged on the shaft 22 in two columns 56 each of which extends longitudinally from the stabilizer 52 to the conical tip 18 of the shaft 22. Each wing 46 in each column 56 is positioned diametrically opposite on the shaft 22 from a wing 46 in the other column 56. Each columns 56 is arranged on the shaft 22 in a spiral or helix configuration and in combination the columns 56 of wings 46 form a double helix configuration about the shaft 22.

Each wing 46 in each column 56 is a separate and discrete element mounted on the shaft 22 from the adjacent wings 46. The wings 46 are spaced both longitudinally and circumferentially from each other. In the embodiment of FIGS. 6-8, each column 56 of wings 46 spirals on the shaft 22 through an arc of about 180° about the circumference of the cross-section of the shaft 22. Moreover, in addition to the positioning of the wings 46 in each column 56, each wing 46 itself has a generally triangular shape with a twisted or spiral bent to it in the longitudinal direction on the shaft 22. A longitudinal axis of each wing 46 is not aligned with the longitudinal axis of the shaft 22 (see FIG. 7). Each wing 46 projects from the outer surface of the shaft 22 in a curved or flared direction and does not project radially from the surface of the shaft 22 (see FIG. 8) but may be considered to project asymmetrically from the shaft 22.

It is believed that the configuration and placement of the wings 46 and their positioning on the shaft 22 of the spike 10 in FIGS. 6-8 will aid in the insertion of the spike 10 into the ground 30 and resist in the unintended removal of the spike 10 from the ground 30 once inserted. With various embodiments of this invention, the benefit of screwing the spike into the ground is achieved, but at a thread pitch of the wings 46 that allows for insertion via pounding axially along the longitudinal axis of the shaft 22 rather than torqueing or screwing the spike 10 into the ground 30. This provides at least two benefits, including the installer can install with a hammer instead of a drill/driver powerful enough to drive a screw this size into hard packed ground 30, and the spike 10 may be made from plastic that does not have to withstand the stresses that might be present when screwing a larger screw into the ground 30. One possible embodiment is a large metal spike 10 with wings 46 having a more traditional thread pitch driven in with a large drill which may perform better regarding its ability to withstand frost heave, but it would be unrealistic to expect most landscape contractors or DYI installers to have such equipment and the spike 10 would be much more expensive. Therefore, the spike 10 according to other embodiments of this invention is plastic. Also, the thread pitch according to embodiments of this invention allows for insertion of the spike 10 through the traditional keyhole design in the edging product 12.

Thread pitch is often expressed in threads per inch. With the embodiment of the spike 10 with the wings 46 having 180 degree rotation over an 8 inch length of the spike 10, this results in one thread count per 8 inches or a 0.125 pitch in one embodiment of this invention.

The inventor believes that while this is but one thread pitch within the scope of this invention, it is believed that any more aggressive of a pitch and the spike 10 would not thread into the ground 30 from just the driving force and would require some torque to be applied for insertion into the ground 30. A lesser pitch would likely be able to be pounded into the ground 30, but the assumption is that the greater the pitch results in more resistance to the spike 10 pulling out of the ground through frost heave or otherwise.

One of ordinary skill in the art will realize that the pitch of the wings 46 is dependent on the diameter and size of the spike 10. If the 8 inch long spike was scaled down to a 4 inch long spike with all proportions remaining the same, the pitch would double to 0.25 but the dynamics during insertion would likely stay the same.

As such, one aspect of various embodiments of this invention is to express the pitch as a proportion of the outer diameter of the wings 46. One embodiment of this invention has a 1.0 inch diameter spike 10 and a 0.125 pitch. Another embodiment has a 0.5 inch diameter spike 10 with a 4.0 inch length resulting in a pitch equal to 0.125/0.5=0.25 pitch. For a 2.0 inch diameter spike 10 with a length of 16.0 inches, the pitch would equal 0.125/2.0=0.0625. One of ordinary skill in the art will appreciate these are only a few of the embodiments within the scope of this invention.

Figure 9:
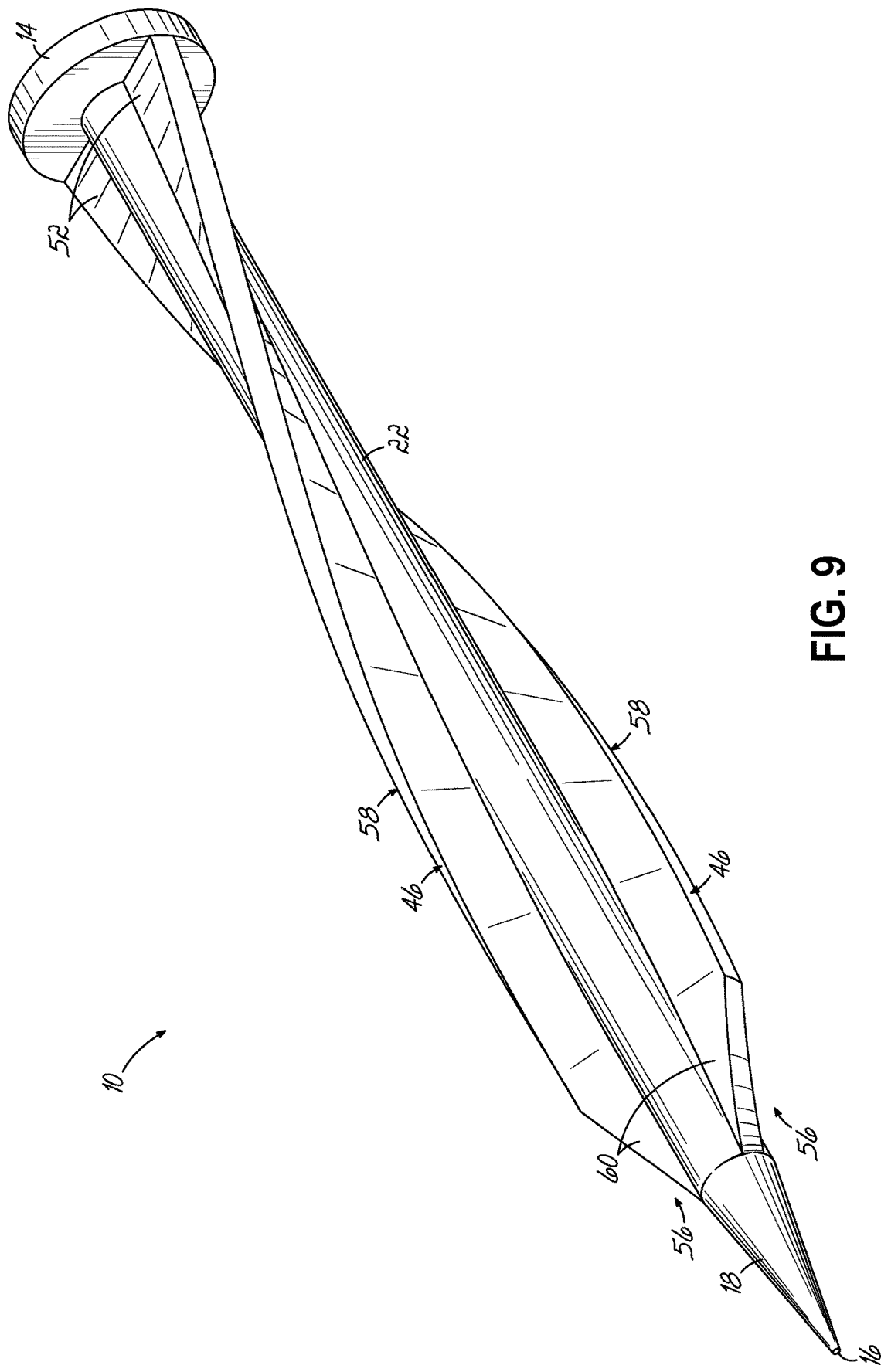
FIG. 9 is a perspective view of a yet further alternative embodiment of a spike according to this invention.
Figure 10:
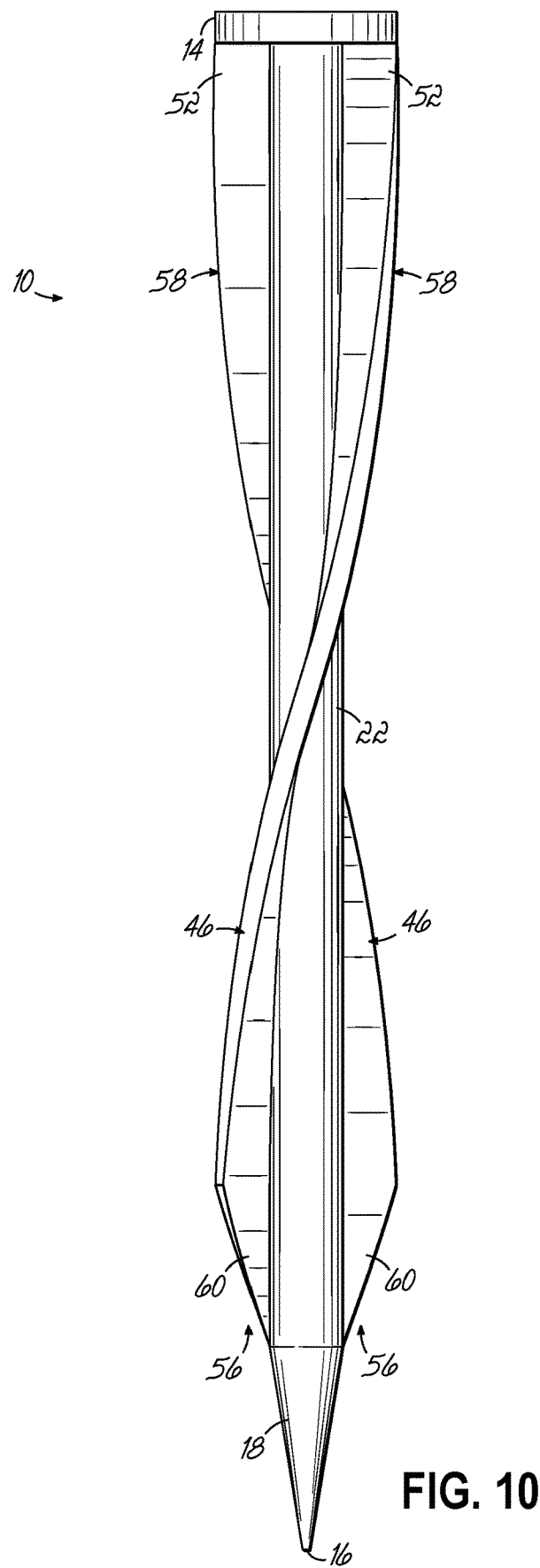
FIG. 10 is front elevational view of the spike of FIG. 9.
Figure 11:
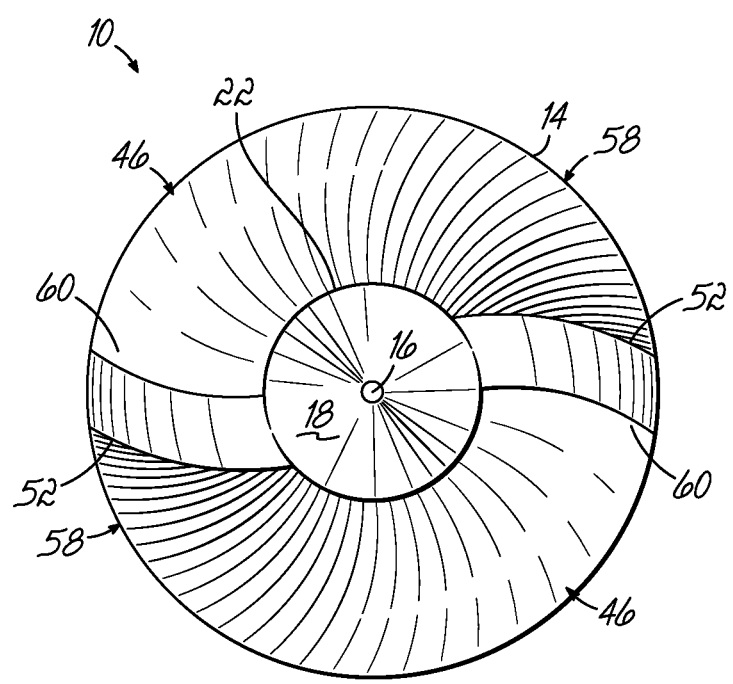
FIG. 11 is a bottom view of the spike of FIGS. 9-10.

FIGS. 9-11 show a further alternative embodiment of the spike 10 according to this invention where like elements are identified by the same reference numerals utilized in prior embodiments of this invention. The stabilizer 52 and the wings 46 are on the shaft 22 in this embodiment and are combined together into a pair of fins 58 which extend from the head 14 to the conical tip 18 of the shaft 22 of the spike 10.

The fins 58 formed by the wings 46 are diametrically opposite from one another on the shaft 22 and each fin 58 is arranged on the shaft 22 in a spiral or helix configuration and in combination the columns 56 of wings 46 or fins 58 form a double helix configuration about the shaft 22. In the embodiment of FIGS. 9-11, each fin 58 on the shaft 22 traverses through an arc of about 180° about the circumference of the cross-section of the shaft 22. Each fin 58 has a constant width from the surface of the shaft 22 but, the width of each fin 58 diminishes or tapers in a distal portion 60 of each fin 58 adjacent to the conical tip 18 of the spike 10. Each fin 58 projects from the surface of the shaft 22 in a curved or flared direction and does not project radially from the surface of the shaft 22 (see FIG. 11) but may be considered to project asymmetrically from the shaft 22.

From the above disclosure of the general principles of this invention and the preceding detailed description of at least one embodiment, those skilled in the art will readily comprehend the various modifications to which this invention is susceptible. Therefore, I desire to be limited only by the scope of the following claims and equivalents thereof.

I claim:

1. A combination comprising:
   an edging product adapted for installation on the ground adjacent to a landscape feature, the edging product including a barrier portion projecting upwardly from an anchor portion; and
   a plurality of spikes each of which is adapted to be inserted through and aperture in the anchor portion to thereby secure the edging product relative to the ground; each spike further comprising:
   a) a head;
   b) a tip spaced from the head;
   c) a shaft having a longitudinal axis and extending between the head and the tip; and
   d) a plurality of wings each projecting outwardly from the shaft, each of the plurality wings having an upper edge oriented generally perpendicular to the longitudinal axis of the shaft, and wherein each wing projects asymmetrically from the shaft.

2. The combination of claim 1 wherein each spike further comprises:
a stabilizer positioned immediately subjacent to the head of the spike.

3. The combination of claim 2 wherein the stabilizer is joined to the shaft of the associated spike and an upper edge of the stabilizer is joined to the head of the associated spike.

4. The combination of claim 2 wherein each spike further comprises a plurality of stabilizers.

5. The combination of claim 4 wherein the plurality of stabilizers on each spike are spaced circumferentially on the spike.

6. The combination of claim 5 wherein the plurality of stabilizers is arranged in pairs with each stabilizer being diametrically opposite from another stabilizer to form a pair of stabilizers.

7. The combination of claim 1 wherein the plurality of wings extend substantially from the head toward the tip of the spike.

8. The combination of claim 1 wherein the plurality of wings extend substantially an entire length of the shaft.

9. The combination of claim 1 wherein the upper edge of each of the plurality of wings is offset circumferentially about the shaft from a longitudinally adjacent wing of the plurality of wings.

10. A spike for securing an edging product for installation on the ground adjacent to a landscape feature, the edging product including a barrier portion projecting upwardly from an anchor portion the spike being adapted to be inserted through and aperture in the anchor portion to thereby secure the edging product relative to the ground, the spike comprising:
a head;
a tip spaced from the head;
a shaft having a longitudinal axis and extending between the head and the tip; and
a plurality of wings positioned subjacent to the head of the spike, each of the plurality wings having an upper edge oriented generally perpendicular to the longitudinal axis of the shaft, and wherein a longitudinal axis of each wing is misaligned with a longitudinal axis of the shaft.

11. The spike of claim 10 wherein the plurality of wings is arranged in pairs with each wing being diametrically opposite from another wing to form one of the pairs of wings.

12. The spike of claim 10 wherein a cross-sectional configuration of the shaft is circular.

13. The spike of claim 10 wherein a configuration of the shaft is a right circular cylinder with the plurality of wings extending outwardly therefrom.

14. The spike of claim 10 wherein each spike further comprises:
a stabilizer positioned immediately subjacent to the head of the spike.

15. The spike of claim 10 wherein the plurality of wings extend substantially from the head toward the tip of the spike.

16. The spike of claim 10 wherein the plurality of wings extend substantially an entire length of the shaft.

17. The spike of claim 10 wherein the upper edge of each of the plurality of wings is offset circumferentially about the shaft from a longitudinally adjacent wing of the plurality of wings.

18. A combination comprising:
an edging product adapted for installation on the ground adjacent to a landscape feature, the edging product including a barrier portion projecting upwardly from an anchor portion; and
a plurality of spikes each of which is adapted to be inserted through and aperture in the anchor portion to thereby secure the edging product relative to the ground; each spike further comprising:
a) a head;
b) a tip spaced from the head;
c) a shaft having a longitudinal axis and extending between the head and the tip; and
d) a plurality of wings each projecting outwardly from the shaft, each of the plurality wings having an upper edge oriented generally perpendicular to the longitudinal axis of the shaft, and wherein a longitudinal axis of each wing is misaligned with a longitudinal axis of the shaft.

* * * * *